US010520127B2

(12) United States Patent
Dearsley et al.

(10) Patent No.: US 10,520,127 B2
(45) Date of Patent: Dec. 31, 2019

(54) MOUNTING SYSTEM CAPABLE OF RECEIVING THREADED AND THREADLESS POSTS

(71) Applicant: Microsoft Technology Licensing, LLC, Redmond, WA (US)

(72) Inventors: Simon Cameron Dearsley, Bellevue, WA (US); Karsten Aagaard, Monroe, WA (US); Eric Paul Witt, Redmond, WA (US); Randal Joseph Kinser, Ballard, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/628,609

(22) Filed: Jun. 20, 2017

(65) Prior Publication Data

US 2018/0363835 A1 Dec. 20, 2018

(51) Int. Cl.
*F16M 13/00* (2006.01)
*F16M 11/04* (2006.01)
*F16M 11/18* (2006.01)
*F16M 13/02* (2006.01)

(52) U.S. Cl.
CPC ............. *F16M 11/04* (2013.01); *F16M 11/18* (2013.01); *F16M 13/022* (2013.01); *F16M 2200/022* (2013.01); *F16M 2200/028* (2013.01)

(58) Field of Classification Search
CPC .......... A47B 91/02; A47G 1/17; F16M 11/04; F16M 13/00
USPC ............ 248/188.4, 309.4, 310; 396/422, 424
See application file for complete search history.

(56) References Cited

U.S. PATENT DOCUMENTS

| 3,747,884 | A | 7/1973 | Steisslinger et al. |
| 6,209,830 | B1 | 4/2001 | Brotz |
| 8,564,944 | B2 | 10/2013 | Whitt, III et al. |
| 9,097,379 | B1* | 8/2015 | Strasser ................ F16M 11/04 |
| 9,309,012 | B1 | 4/2016 | Kilgore et al. |
| 2004/0118985 | A1 | 6/2004 | Omps |
| 2008/0023607 | A1 | 1/2008 | Barker |
| 2008/0247746 | A1 | 10/2008 | Law et al. |
| 2010/0237206 | A1 | 9/2010 | Barker |
| 2012/0275778 | A1 | 11/2012 | Ogasawara et al. |
| 2015/0070575 | A1 | 3/2015 | Lee et al. |

FOREIGN PATENT DOCUMENTS

DE 202011101534 U1 9/2011

OTHER PUBLICATIONS

"International Search Report and Written Opinion Issued in PCT Application No. PCT/US18/034250", dated Aug. 27, 2018, 12 Pages.

* cited by examiner

*Primary Examiner* — Clayton E. LaBalle
*Assistant Examiner* — Fang-Chi Chang
(74) *Attorney, Agent, or Firm* — Wade IP Law LLC

(57) ABSTRACT

Techniques are described herein that are capable of enabling a mounting system to receive threaded and threadless posts. The mounting system may have a cavity (a.k.a. void) that is configured to receive such posts. An interior surface of the cavity may include threads to allow corresponding threads of a threaded post to be twisted (e.g., screwed) into the threads of the cavity. The threads of the cavity may be configured to allow a threadless post to pass through the cavity without being encumbered by the threads. The mounting system uses magnetism and a taper of the cavity to facilitate magnetically and frictionally engaging the threadless post in the cavity.

20 Claims, 7 Drawing Sheets

MOUNTING SYSTEM CAPABLE OF RECEIVING THREADED AND THREADLESS POSTS

BACKGROUND

A mountable object (e.g., a camera or a microphone) often includes a threaded socket so that the object can be mounted to a post having corresponding threads. For instance, the threaded socket may be twisted onto the threads of the post to secure the object to the post. It may be desirable to reposition the object in a variety of positions. Several mounting systems have been proposed for enabling a mountable object to be repositioned. However, each such mounting system has its limitations.

In one example, a post is attached to a flexible base that allows the post to be rotated about a pivot point. Rotation of the post about the pivot point causes an object that is connected to the post to rotate about the pivot point, as well. In another example, an object is connected to a base via a snapping mechanism. The snapping mechanism may be used in lieu of a post to mount the object.

However, such conventional mounting systems often are cumbersome to adjust, have relatively poor mechanical quality, and/or require complete disassembly to reposition a mounted object. Accordingly, repositioning a mounted object using such a conventional mounting system may consume a substantial amount of time. Moreover, poor mechanical quality may lead to mechanical failure and costly repairs.

SUMMARY

Various approaches are described herein for, among other things, enabling a mounting system to receive threaded and threadless posts. A threaded post is a post that includes threads that are configured to frictionally engage threads of the mounting system. A threadless post is a post that does not include threads that are configured to frictionally engage threads of the mounting system. It should be noted that a threadless post may include threads, so long as those threads are not configured to frictionally engage threads of the mounting system.

In accordance with the approaches described herein, the mounting system may have a cavity (a.k.a. void) that is configured to receive such posts. An interior surface of the cavity may include threads to allow corresponding threads of a threaded post to be twisted (e.g., screwed) into the threads of the cavity. The threads of the cavity may be configured to allow a threadless post to pass through the cavity without being encumbered by the threads. For instance, an interior diameter of the threads of the cavity may be greater than or equal to a diameter of the threadless post so that the threadless post may slide across the threads. In an example implementation, an interior edge of the threads of the cavity may be shaved to enable unencumbered passage of the threadless post through the cavity. In accordance with this example, the portion of the threads that remains after the interior edge is shaved is sufficient to secure the threaded post in the cavity. The mounting system uses magnetism and a taper of the cavity to facilitate securing the threadless post in the cavity. For instance, the taper may be a locking taper. A locking taper is a taper having an angle that is configured to cause a tapered end of a threadless post to be locked in physical contact with the taper when the tapered end of the threadless post is inserted into the taper. For instance, the locking taper may control (i.e., limit or prevent) rotational torque of the threadless post relative to the taper once the threadless post is locked in physical contact with the taper.

In an example approach, a mounting system includes a socket structure having an interior surface that defines a void. The void extends a designated distance along an axis from a first point corresponding to an exterior surface of the socket structure toward an interior of the socket structure. The interior surface has a first portion and a second portion. The first portion has threads configured to frictionally engage a threaded post. The first portion is positioned between the first point and the second portion. The second portion includes a taper that is configured to frictionally engage a threadless post. The mounting system further includes a magnet and/or a ferromagnetic element configured to cause the threadless post to slide over the threads of the first portion and to become magnetically engaged in the second portion.

In another example approach, a device includes a housing, a socket structure, and a magnet and/or a ferromagnetic element. The socket structure extends along an axis from an exterior point corresponding to an outer surface of the housing to an interior point (e.g., within the housing). The socket structure includes a threaded portion and an unthreaded portion. A threaded portion is a portion that includes threads configured to frictionally engage threads of a threaded post. An unthreaded portion is a portion that does not include threads that are configured to frictionally engage the threads of the threaded post. The threaded portion is positioned between the exterior point and the unthreaded portion. The unthreaded portion includes a tapered portion. The magnet and/or the ferromagnetic element is positioned proximate the interior point to cause a threadless post to slide across the threads of the threaded portion and to become magnetically engaged with the socket structure. The tapered portion of the unthreaded portion is configured to frictionally engage the threadless post.

In yet another example approach, a device includes a housing, a socket structure, and a magnet and/or a ferromagnetic element. The socket structure extends along an axis from an exterior point corresponding to an outer surface of the housing to an interior point. The socket structure includes threads configured to frictionally engage a threaded post. The socket structure includes a tapered portion configured to frictionally engage a threadless post. The socket structure is configured to expose the threadless post to physical contact with the threads and to enable the threadless post to slide across the threads. The magnet and/or the ferromagnetic element is positioned proximate the interior point and is configured to cause the threadless post to be magnetically held in the socket structure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
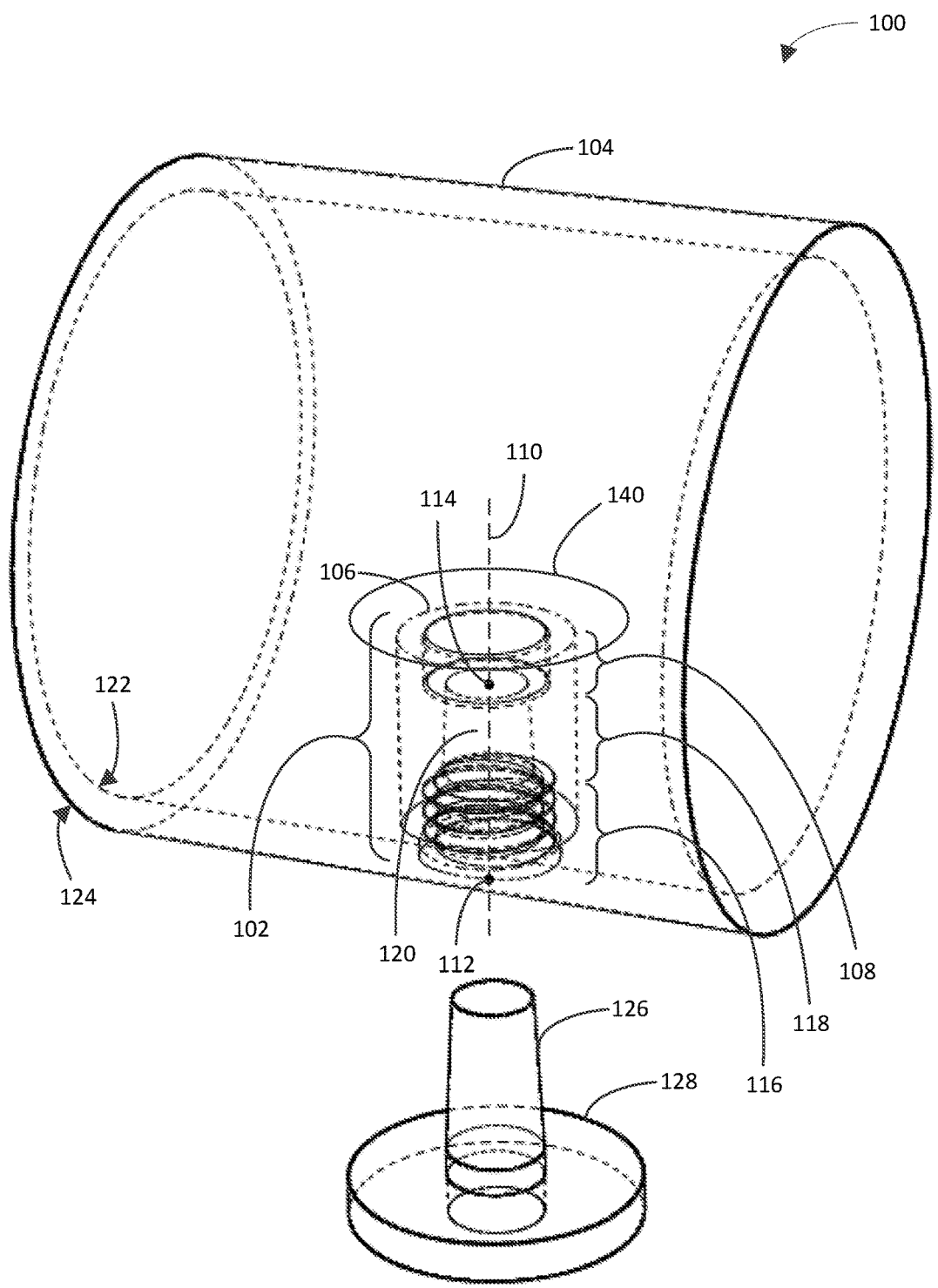
FIG. 1 is a three-dimensional view of an example device including a mounting system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of enabling a mounting system to receive threaded and threadless posts. A threaded post is a post that includes threads that are configured to frictionally engage threads of the mounting system. A thread may be described as a ridge that is wrapped around a real or imaginary cylinder in the form of a helix, though the example embodiments are not limited in this respect. A threadless post is a post that does not include threads that are configured to frictionally engage threads of the mounting system. It should be noted that a threadless post may include threads, so long as those threads are not configured to frictionally engage threads of the mounting system.

In accordance with the approaches described herein, the mounting system may have a cavity (a.k.a. void) that is configured to receive the threaded and threadless posts. An interior surface of the cavity may include threads to allow corresponding threads of a threaded post to be twisted (e.g., screwed) into the threads of the cavity. The threads of the cavity may be configured to allow a threadless post to pass through the cavity without being encumbered by the threads. For instance, an interior diameter of the threads of the cavity may be greater than or equal to a diameter of the threadless post so that the threadless post may slide across the threads. In an example implementation, an interior edge of the threads of the cavity may be shaved to enable unencumbered passage of the threadless post through the cavity. In accordance with this example, the portion of the threads that remains after the interior edge is shaved is sufficient to secure the threaded post in the cavity. The mounting system uses magnetism and a taper to facilitate securing the threadless post in the cavity. For instance, the taper may be a locking taper. A locking taper is a taper having an angle that is configured to cause a tapered end of a threadless post to be locked in physical contact with the taper when the tapered end of the threadless post is inserted into the taper.

Example techniques described herein have a variety of benefits as compared to conventional techniques for mounting and/or unmounting an object (e.g., a device). For instance, the example techniques may enable a mounting system to receive threadless (e.g., smooth) and threaded posts, each of which may have a standard or custom configuration. The example techniques may enable a threadless post to be both magnetically and frictionally engaged (e.g., simultaneously) in a cavity of the mounting system. The example techniques may be capable of reseating the threadless post in a taper of the cavity when the threadless post becomes unseated (e.g., dislodged) from the taper. The magnetic attraction between the threadless post and a magnet and/or ferromagnetic element in the mounting system may be sufficient to enable the weight of an object that includes the mounting system to be suspended stably in any orientation. The mounting system may be used as a rotation pivot with some degree of friction for quick and easy repositioning of the object.

The example techniques may increase user efficiency (e.g., by reducing a number of steps that a user takes to mount and/or dismount an object). For instance, a user may remove an object from a threadless post and reattach the object to the same threadless post or attach the object to a different threadless post relatively easily by manually pulling on the object. Accordingly, the example techniques may eliminate a need to twist the object onto (or off of) a threaded post in order to mount (or unmount) the object, which may save time and/or avoid twisting cable(s) that are connected to the object. The example techniques may enable the object to be rotated on a post with a suitable amount of friction to enable quick and easy repositioning.

The example techniques may enable a manufacturer of an object to ship the object with a threadless post, rather than a threaded post. A threadless post is likely to have a lower manufacturing cost than a threaded post. For example, manufacturing a threaded post may include more steps than the number of steps that are used to manufacture a threadless post. In another example, at least some of the steps used to manufacture a threaded post may be more complex (e.g., require more tooling, precision, and/or time) than the steps that are used to manufacture a threadless post.

One type of device to which the techniques described herein apply is a camera, such as a web camera. For example, a user may create a video log (vlog) posting (e.g., a make-up tutorial) in which the camera is placed behind a ring light relative to the user. In accordance with this example, the techniques described herein may enable the user to quickly and easily remove the camera from a threadless post mounted on the user's computer (e.g., via a spring clip or a sticky pad) and attach the camera to a threadless post that is positioned behind the ring light. In another example, the camera may be positioned to capture a close-up of a user drawing on a touch screen of a tablet computer, a Microsoft Surface® computer (e.g., in tablet mode), or other type of computing device by sliding the camera onto a threadless post located proximate the touch screen. Accordingly, the example techniques may enable a user to use the camera in creative capture, such that the camera has the capability to be repositioned in a variety of different positions around a computing device, in addition to being used for conventional Voice over Internet Protocol (VoIP) calls (e.g., Skype® calls). The user may still use threads of the mounting system in the camera to attach the camera to a standard camera tripod or monopod, for example, at any time.

FIG. 1 is a three-dimensional view of an example device 100 including a mounting system 102 in accordance with an embodiment. As shown in FIG. 1, the device 100 further includes a housing 104. The housing 104 is shown to have an inner surface 122 and an outer surface 124. The housing 104 may partially or entirely encapsulate the mounting system 102, though the scope of the example embodiments is not limited in this respect.

The mounting system 102 includes a socket structure 106 and a magnet 108 (e.g., a permanent magnet). The socket structure 106 is configured to receive threaded posts and threadless posts. For instance, the socket structure 106 may have a cavity 120 formed therein to receive such threaded posts and threadless posts. The socket structure 106 extends along an axis 110 from an exterior point 112 corresponding to the outer surface 124 of the housing 104 to an interior point 114. For instance, the interior point 114 may be within a volume that is defined by the inner surface 122 of the housing 104.

The socket structure 106 includes a first portion 116 and a second portion 118. The first portion 116 is positioned between the exterior point 112 and the second portion 118. The first portion 116 includes threads configured to frictionally engage a threaded post. For example, the threads of the first portion 116 may be configured to twist onto threads of the threaded post. In accordance with this example, the threads of the first portion 116 may releasably engage the threaded post, such that the threaded post may be disengaged from the threads of the first portion 116 by a user manually twisting the threaded post relative to the socket structure 106 and/or manually twisting the socket structure 106 relative to the threaded post. It will be recognized that manually twisting the socket structure 106 may include manually twisting the device 100, which includes the socket structure 106. An example of a threaded post is discussed in further detail with reference to FIG. 4 below, and reception of a threaded post in an example mounting system is discussed in further detail with reference to FIG. 5 below.

The second portion 118 of the socket structure 106 includes a tapered portion, which is configured to frictionally engage (e.g., hold) a threadless post. For example, the tapered portion may be configured to form a frictional lock with the threadless post when a force that exceeds a locking threshold is used to cause the frictional engagement. For instance, the locking threshold may be a minimum force that is capable of causing the tapered portion and the threadless post to become frictionally bound to each other. Accordingly, the threadless post may be releasably locked in the tapered portion by applying the force to initiate the frictional engagement. In accordance with this example, the frictional lock may prevent the threadless post from becoming disengaged from the tapered portion unless a force that exceeds an unlocking threshold is applied to the threadless post and/or the tapered portion. For instance, the unlocking threshold may be a minimum force that is capable of causing the tapered portion and the threadless post to become unbound from each other. Example functionality of the tapered portion is discussed in further detail with reference to FIG. 2 below.

In an example embodiment, the socket structure 106 is configured to enable the threadless post to slide across the threads that are included in the first portion 116 of the socket structure 106. It will be recognized that the threadless post need not necessarily be exposed to physical contact with the threads in order for the socket structure 106 to enable the threadless post to slide across the threads, though it will be further recognized that the socket structure 106 may be configured to expose the threadless post to physical contact with the threads.

In another example embodiment, the first portion 116 of the socket structure 106 is a threaded portion, and the second portion 118 of the socket structure 106 is an unthreaded portion. A threaded portion is a portion that includes threads configured to frictionally engage threads of a threaded post. An unthreaded portion is a portion that does not include threads that are configured to frictionally engage the threads of the threaded post. For instance, the unthreaded portion may have a smooth, cylindrical surface.

The magnet 108 is positioned proximate the interior point 114 to cause the threadless post to become magnetically engaged with the socket structure 106. For instance, the magnetic force of the magnet 108 may cause the threadless post to be magnetically held in the socket structure 106. If the threadless post becomes frictionally disengaged from the tapered portion (e.g., in response to a force that exceeds the unlocking threshold being applied to the threadless post and/or the tapered portion), the magnetic force of the magnet 108 may cause the threadless post to become frictionally re-engaged with the tapered portion. For example, the magnetic force of the magnet 108 may cause the frictional lock that previously existed between the threadless post and the tapered portion to be re-established. In accordance with this example, the magnetic force may be sufficient to cause the frictional lock to be re-established even when the device 100 is positioned upside down (i.e., when the interior point 114 is positioned between the exterior point 112 and a gravitational center of the Earth).

It will be recognized that the mounting system 102 need not necessarily include the magnet 108. For example, the mounting system 102 may include a ferromagnetic element in lieu of the magnet 108 to cause the threadless post to be magnetically engaged with the socket structure 106. In accordance with this example, the threadless post may include a magnet to facilitate the magnetic attraction between the threadless post and the ferromagnetic element. Examples of a ferromagnetic element include but are not limited to iron, nickel, cobalt, and many alloys of any one or more thereof.

It will be further recognized that the mounting system 102 may include a ferromagnetic element in addition to the magnet 108. It will be further recognized that the mounting system 102 may include a first magnet, and the threadless post may include a second magnet. The first magnet in the mounting system 102 and the second magnet in the threadless post may be configured to magnetically attract each other.

The device 100 further includes a shield 140, which is configured to shield other components of the device 100 from the magnetic field that is generated by the magnet 108 and/or a magnetic field that is received from the threadless post. For instance, the shield 140 may reduce an amount of magnetic interference that is imposed on the other components by the magnetic field(s). The shield 140 may facilitate concentrating the magnetic field of the magnet 108 in the direction of the exterior point 112. The shield 140 is shown in FIG. 1 to be planar for non-limiting, illustrative purposes. It will be recognized that the shield 140 may have any suitable shape. For example, the shield 140 may be formed to include a cavity. In accordance with this example, the cavity of the shield 140 may surround at least a portion of the magnet 108. In further accordance with this example, the cavity of the shield 140 may surround at least a portion of the socket structure 106. In another example, the shield 140 may be incorporated into the socket structure 106. The shield 140 may include any suitable material, including but not limited to metal or metal alloy (e.g., nickel and/or iron alloy). Including the shield 140 may enable the magnet 108 to be smaller to obtain the same magnetic performance as a scenario in which the magnet 108 is not included in the device 100. Having a smaller magnet 108 may reduce a cost of the device 108. Nevertheless, it will be recognized that the device 100 need not necessarily include the shield 140.

A threadless post 126 is configured to be received in the mounting system 102 (more particularly, in the socket structure 106). The threadless post 126 includes a magnet and/or a ferromagnetic material to facilitate the magnetic attraction between the threadless post 126 and the magnet 108 and/or a ferromagnetic element in the mounting system 102. For example, the threadless post 126 may include a ferromagnetic material, and the mounting system 102 may include the magnet 108. In another example, the threadless post 126 may include a magnet, and the mounting system 102 may include a ferromagnetic element in addition to or in lieu of the magnet 108. The threadless post 126 may be a rigid or semi-rigid member. Reception of a threadless post in an example mounting system is discussed in further detail with reference to FIG. 3 below.

The threadless post 126 is shown in FIG. 1 for illustrative purposes and is not intended to be limiting. Moreover, the threadless post 126 is shown to be attached to the base 128 for non-limiting, illustrative purposes. It will be recognized that the device 100 need not necessarily include the threadless post 126 and/or the base 128. Moreover, the threadless post 126 need not necessarily be attached to the base 128.

The device 100 may be any suitable device, including but not limited to a camera (e.g., web camera), a microphone, a mirror, a mechanical screen, a display screen, a light fixture, a personal digital assistant, a tablet computer, a puffer guard, or a road sign. A puffer guard (a.k.a. spit guard) is commonly used in the recording industry in combination with a microphone to diffuse puffs of air that are produced during speech. The device 100 may include components in addition to or in lieu of any one or more of the components described above. For example, if the device 100 is a camera (or includes a camera), the device 100 may further include optical equipment configured to capture images of an environment of the device 100. In accordance with this example, the device 100 may further include processor(s) configured to process the images.

Figure 2:
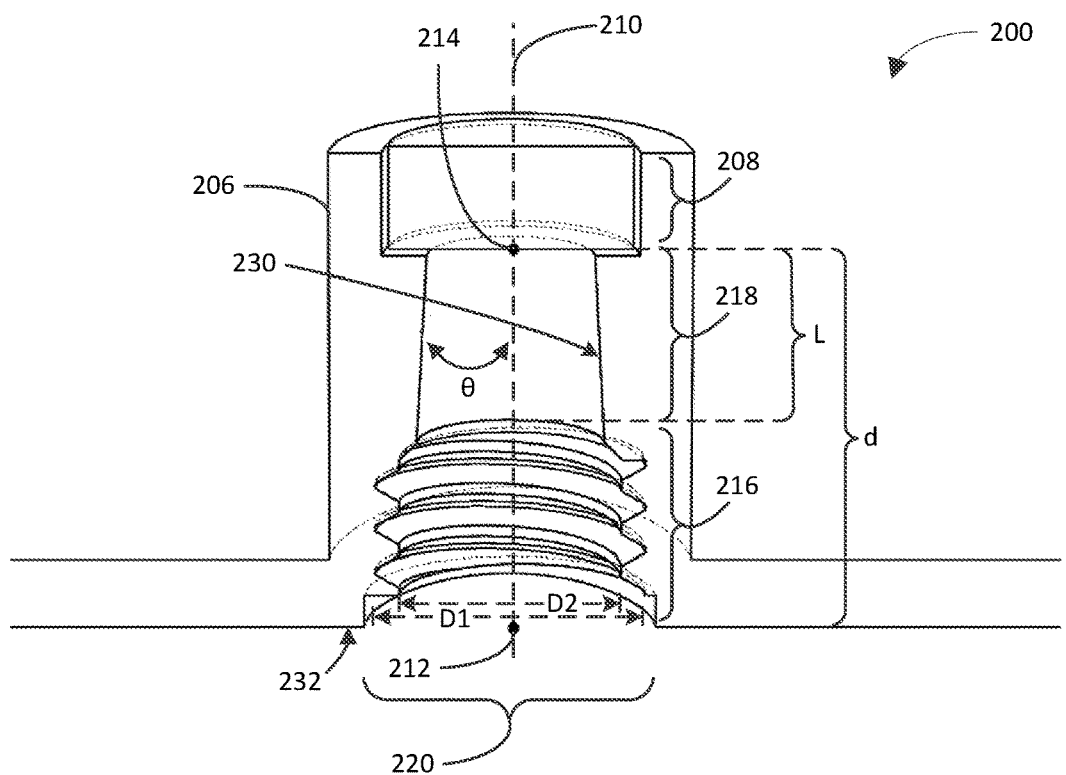
FIG. 2 is a cross-sectional view of an example mounting system in accordance with an embodiment.

FIG. 2 is a cross-sectional view of an example mounting system 200 in accordance with an embodiment. The mounting system 200 includes a socket structure 206 and a magnet 208. The socket structure 206 has an interior surface 230 that defines a void 220. The void 220 extends a designated distance, d, along an axis 210 from a first point 212 corresponding to an exterior surface 232 of the socket structure 206 toward an interior of the socket structure (e.g., to a second point 214 on the axis 210). The interior surface 230 of the socket structure 206 has a first portion 216 and a second portion 218. The first portion 216 is positioned between the first point 212 and the second portion 218.

The first portion 216 of the socket structure 206 has threads configured to frictionally engage (e.g., form a frictional lock with) a threaded post. The threads have a major diameter D1 and a minor diameter D2, as depicted in FIG. 2. The major diameter D1 and the minor diameter D2 are substantially perpendicular to the axis 210. The threads may have a major diameter D2 of any suitable distance, including but not limited to ¼ of an inch, 5/16 of an inch, ⅜ of an inch, and ½ of an inch. The threads may have any suitable density, including but not limited to 13 threads/inch, 16 threads/inch, 18 threads/inch, 20 threads/inch, 24 threads/inch, 28 threads/inch, and 32 threads/inch. The threads may comply with the Unified Thread Standard (UTS), though the scope of the example embodiments is not limited in this respect. Some example thread designations under the UTS include but are not limited to ¼"-20 UNC, 5/16"-18 UNC, ⅜"-16 UNC, ½"-13 UNC, ¼"-28 UNF, 5/16"-24 UNF, ⅜"-24 UNF, ½"-20 UNF, ¼"-32 UNEF, 5/16"-32 UNEF, ⅜"-32 UNEF, and ½"-28 UNEF, where the first number in each designation indicates the major diameter of the threads, the second number indicates the density of the threads in threads/inch, the letters "UNC" indicate a course thread density, the letters "UNF" indicate a fine thread density, and the letters "UNEF" indicate an extra fine thread density.

A depth of the threads is defined as the difference between the major diameter D1 and the minor diameter D2. The entire depth of the threads may not be necessary to frictionally engage the threaded post. For instance, at least some of the depth may be removed without compromising the frictional engagement. Accordingly, at least a designated percentage (e.g., 25%, 50%, 75%, 85%, 90%, or 95%) of the depth may be removed, for example, to facilitate the threadless post sliding over the threads.

The second portion 218 of the socket structure 206 includes a taper that is configured to frictionally engage (e.g., form a frictional lock with) a threadless post. A surface of the taper may be defined along the interior surface 230 of the socket structure 206. An angle θ between the axis 210 and the surface of the taper may be approximately three degrees. For example, the angle θ may be in range between 2.5 degrees and 3.5 degrees. In another example, the angle θ may be in range between 2 degrees and 4 degrees. The second portion 218 (or a projection of the taper therein on the axis 210) may have a length L along the axis 210 that is at least a designated distance. For instance, the length L may be at least 2 millimeters (mm), at least 2.5 mm, at least 3 mm, at least 4 mm, or at least 5 mm.

The socket structure 206 may include any suitable material, including but not limited to metal, metal alloy (e.g., steel or aluminum), moldable polymer material (e.g., plastic), or any combination thereof. For example, such material may have a surface that defines the taper in the second portion 218 of the socket structure 206. In accordance with this example, the material may be configured to conform to a tapered end of the threadless post (e.g., to facilitate establishing a lock with the tapered end of the threadless post).

The magnet 208 is configured to cause the threadless post to become magnetically engaged with the second portion 218. For instance, the magnet 208 may generate a magnetic field that causes the threadless post to become magnetically engaged with the taper in the second portion 218 and/or to be magnetically held in the void 220. The magnet 208 may be configured to cause the threadless post to slide over the threads of the first portion 216. For example, the magnetic field that is generated by the magnet 208 may be strong enough to pull the threadless post across the threads of the first portion 216 (e.g., and into the taper of the second portion 218). In accordance with this example, the magnetic field may cause the threadless post to snap into a locked position in the taper of the second portion 218. In another example, the magnet 208 may generate a magnetic force along the axis 210 that is greater than a force of gravity (e.g., of the Earth).

The magnet 208 may include any suitable type and/or configuration of magnet(s). For instance, magnet 208 may include a flux fountain and/or a Halbach array of magnets, which may be configured to direct a magnetic field along the axis 210 toward the first point 212.

A flex fountain includes a first magnet disposed such that a magnetic field generated by the first magnet is aligned along a first axis. Second and third magnets are disposed at opposing sides of the first magnet. The second and third magnets generate respective magnetic fields that are aligned along a second axis that is substantially perpendicular to the first axis. In an example implementation, the first magnet is disposed proximate the second point 214 and generates a magnetic field aligned along the axis 210 in a direction toward the first point 212. In accordance with this implementation, the magnetic fields of the second and third magnets are aligned along the second axis, which is substantially perpendicular the axis 210. For instance, the second magnet may generate its magnetic field in a first direction along the second axis, and the third magnet may generate its magnetic field in a second direction, which is substantially opposite the first direction, along the second axis. In further accordance with this implementation, the magnetic field of the first magnet and the magnetic fields of the second and third magnets may combine to provide a cumulative magnetic field that is substantially focused along the axis 210 in a direction toward the first point 212. In one aspect, the cumulative magnetic field of the flux fountain may extend further along the axis 210 than the magnetic field of the first magnet alone. In another aspect, the cumulative magnetic field of the flux fountain may have a width, which is perpendicular to the axis 210, that is less than a width of the magnetic field of the first magnet alone.

A Halbach array of magnets includes multiple magnets configured in an array such that the magnetic fields of the magnets reinforce each other on a first side of the array and cancel each other on a second side of the array that is opposite the first side. For instance, the array may have a spatially rotating pattern of magnetism what causes the magnetic fields to reinforce each other on the first side and cancel each other on the second side. To illustrate the concept using simple terms, a first magnet may have a magnetic field that points right; a second magnet may have a magnetic field that points down; a third magnet may have a magnetic field that points left; and a fourth magnet may have a magnetic field that points up. This pattern may result in a cumulative field that points down and substantially no field pointing up. The pattern may be repeated any suitable number of times to provide the desired magnetic force. It will be recognized that the directions used in the example above are provided for illustrative purposes and are not intended to be limiting. It will be further recognized that a Halbach array of magnets may be provided in any suitable orientation to provide a cumulative magnetic field that points in any suitable direction.

It will be recognized that the mounting system 200 may include a ferromagnetic element in addition to or in lieu of the magnet 208, and the description above pertaining to the magnet 208 is applicable to such ferromagnetic element. For instance, magnetic forces that are described as being generated by the magnet 208 may be received by the ferromagnetic element from a magnet in the threadless post.

Figure 3:
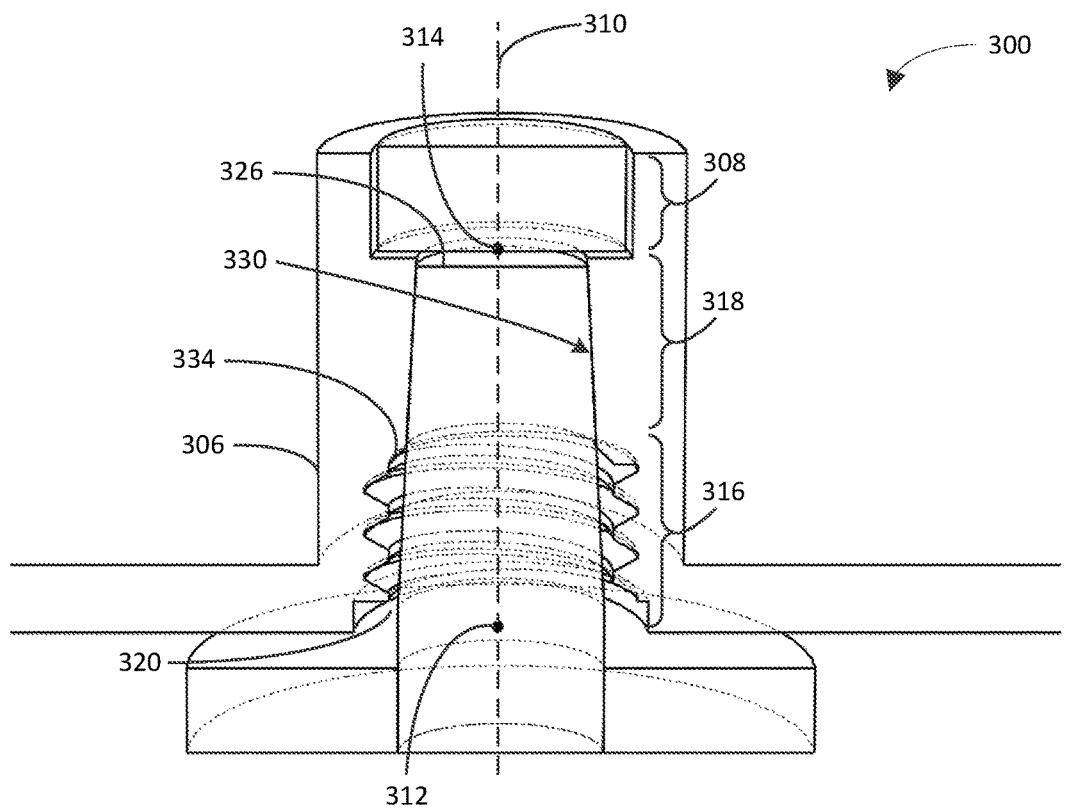
FIG. 3 is a cross sectional view of an example mounting system in which a threadless post is received in accordance with an embodiment.

FIG. 3 is a cross sectional view of an example mounting system 300 in which a threadless post 326 is received in accordance with an embodiment. The mounting system 300 includes a socket structure 306 and a magnet 308, which function in a manner similar to the socket structure 206 and the magnet 208 described above with reference to FIG. 2. The socket structure 306 has an interior surface 330 that defines a void 320, which extends along an axis 310 from a first point 312 toward an interior of the socket structure 306 (e.g., to a second point 314 on the axis 310). The interior surface 330 has a first portion 316 and a second portion 318. The first portion 316 is positioned between the first point 312 and the second portion 318. The first portion 316 includes threads 334. The second portion 318 includes a taper.

The threadless post 326 is shown to be magnetically and frictionally engaged in the void 320. For example, the magnet 308 may generate a magnetic field that produces a magnetic force sufficient to pull the threadless post 326 across the threads 334 toward the magnet 308. The magnetic force may be sufficient to hold the threadless post 326 in the void 320. For instance, the magnetic force may releasably or temporarily hold the threadless post 326 in the void 320. The magnetic force may be sufficient to cause the threadless post 326 to be frictionally engaged (e.g., form a frictional lock) with the second portion 318 of the interior surface 330. For instance, the magnetic force may be greater than or equal to a minimum force that is capable of causing the threadless post 326 to become frictionally bound to the taper of the second portion 318. The threadless post 326 may have a tapered end having an angle that corresponds to (e.g., is substantially the same as) the angle of the taper in the second portion 318 to facilitate frictional engagement of the threadless post 326 with the second portion 318.

The threadless post 326 may include any suitable material, including but not limited to a magnet, metal, metal alloy (e.g., steel or aluminum), moldable polymer material (e.g., plastic), or any combination thereof. For example, the threadless post 326 may be at least partially coated (e.g., over-molded) with a moldable polymer material. In one aspect of this example, such a coating may facilitate frictional engagement of the threadless post 326 with the second portion 318. For instance, the coating may increase the coefficient of friction between the threadless post 326 and the second portion 318. In another aspect, the coating may mitigate the production of sounds as the threadless post 326 slides across the threads 334 and/or becomes frictionally engaged with the second portion 318. In yet another aspect, the coating may decrease the coefficient of friction between the threadless post 326 and the first portion 316. For instance, the coating may include Teflon® or a chrome plating. In one implementation, the coating may include a first material to increase the coefficient of friction between the threadless post 326 and the second portion 318 and a second coating to decrease the coefficient of friction between the threadless post 326 and the first portion 316. In accordance with this implementation, the first coating may be on a first section of the threadless post 326 that corresponds to the second portion 318, and the second coating may be on a second section of the threadless post 326 that corresponds to the first portion 316.

In another example, the threadless post 326 may include a flux fountain configured to facilitate magnetic engagement of the threadless post 326 with the second portion 318. In an aspect of this example, the threadless post 326 may include a first flux fountain, and the magnet 308 may include a second flux fountain. In accordance with this aspect, the first and second flux fountains may attract each other to provide a substantially strong magnetic force therebetween.

Figure 4:
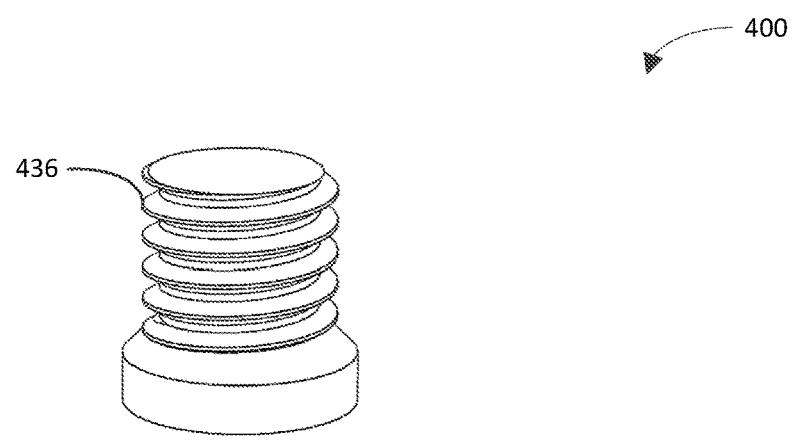
FIG. 4 is a three-dimensional view of an example of a threaded post.

FIG. 4 is a three-dimensional view of an example of a threaded post 400. Threaded post 400 is configured to be frictionally engaged with threads of a socket structure (e.g., threads 334 in socket structure 306). For instance, the threads 436 may have a density and major diameter that match the density and major diameter of the threads in the socket structure. The threaded post 400 may include any suitable material, including but not limited to metal, metal alloy (e.g., steel or aluminum), moldable polymer material (e.g., plastic), or any combination thereof.

Figure 5:
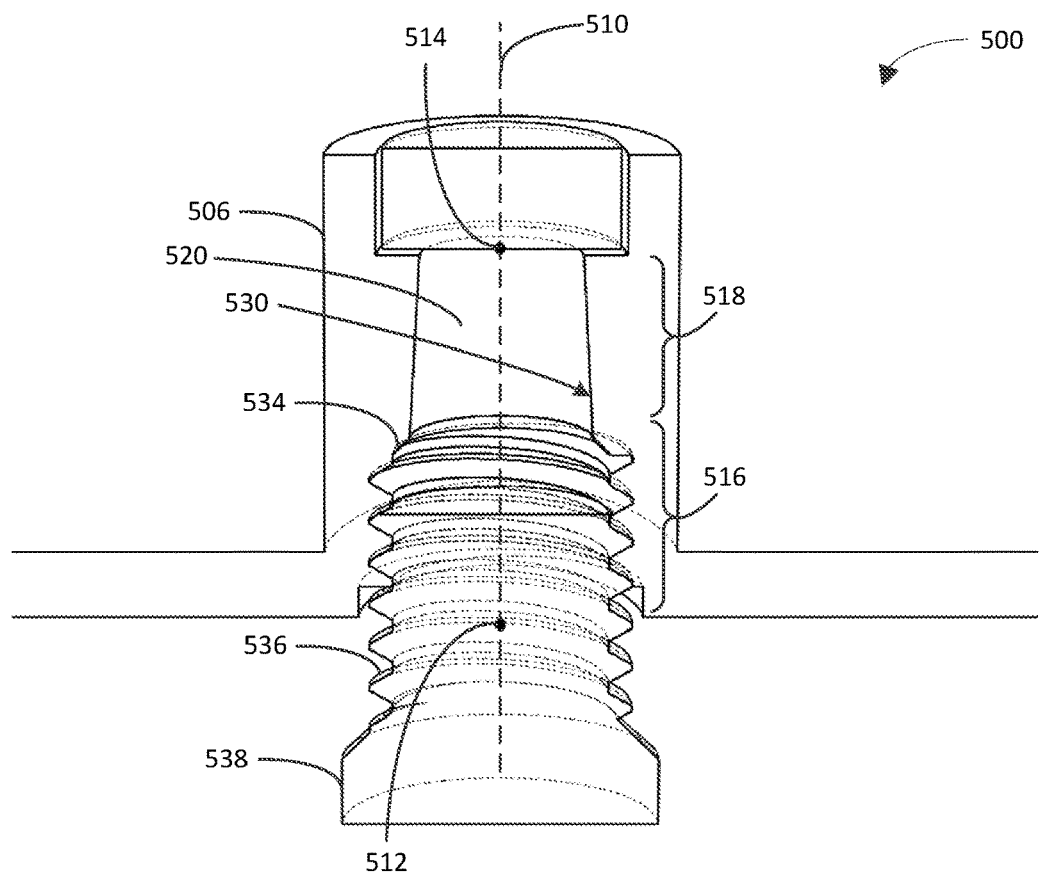
FIG. 5 is a cross-sectional view of a mounting system in which a threaded post is received in accordance with an embodiment.

FIG. 5 is a cross-sectional view of a mounting system 500 in which a threaded post 538 is received in accordance with an embodiment. The mounting system 500 includes a socket structure 506, which has an interior surface 530 that defines a void 520. The void 520 extends along an axis 510 from a first point 512 toward an interior of the socket structure 506 (e.g., to a second point 514 on the axis 510). The interior surface 530 has a first portion 516 and a second portion 518. The first portion 516 is positioned between the first point 512 and the second portion 518. The first portion 516 includes threads 534. The second portion 518 includes a taper.

The threaded post 338 includes threads 536. The threads 536 are shown in FIG. 5 to be frictionally engaged with the threads 534 of the first portion 516 of the interior surface 530. As shown in FIG. 5, the threads 536 have been partially twisted onto the threads 534 for non-limiting, illustrative purposes. It will be recognized that the frictional engagement between the threads 534 and 536 may be strengthened by twisting all of the threads 536 onto the threads 534 and/or twisting all of the threads 534 onto the threads 536. The threads 534 and the threads 536 may include any suitable number of turns. For instance, each of the threads 534 and 536 may include 3, 4, 5, 6, 7, or 8 turns. Three turns on each of the threads 534 and 536 may be sufficient to enable a frictional lock to be formed between the threads 534 and the threads 536. The number of turns in the threads 534 may be the same as or different from the number of turns in the threads 536.

It will be recognized that each of the mounting systems 200, 300, and 500 described above with reference to respective FIGS. 2-3 and 5 may not include one or more of the components shown therein. Furthermore, each of the mounting systems 200, 300, and 500 may include one or more components in addition to or in lieu of any one or more of the components shown therein.

Figure 6:
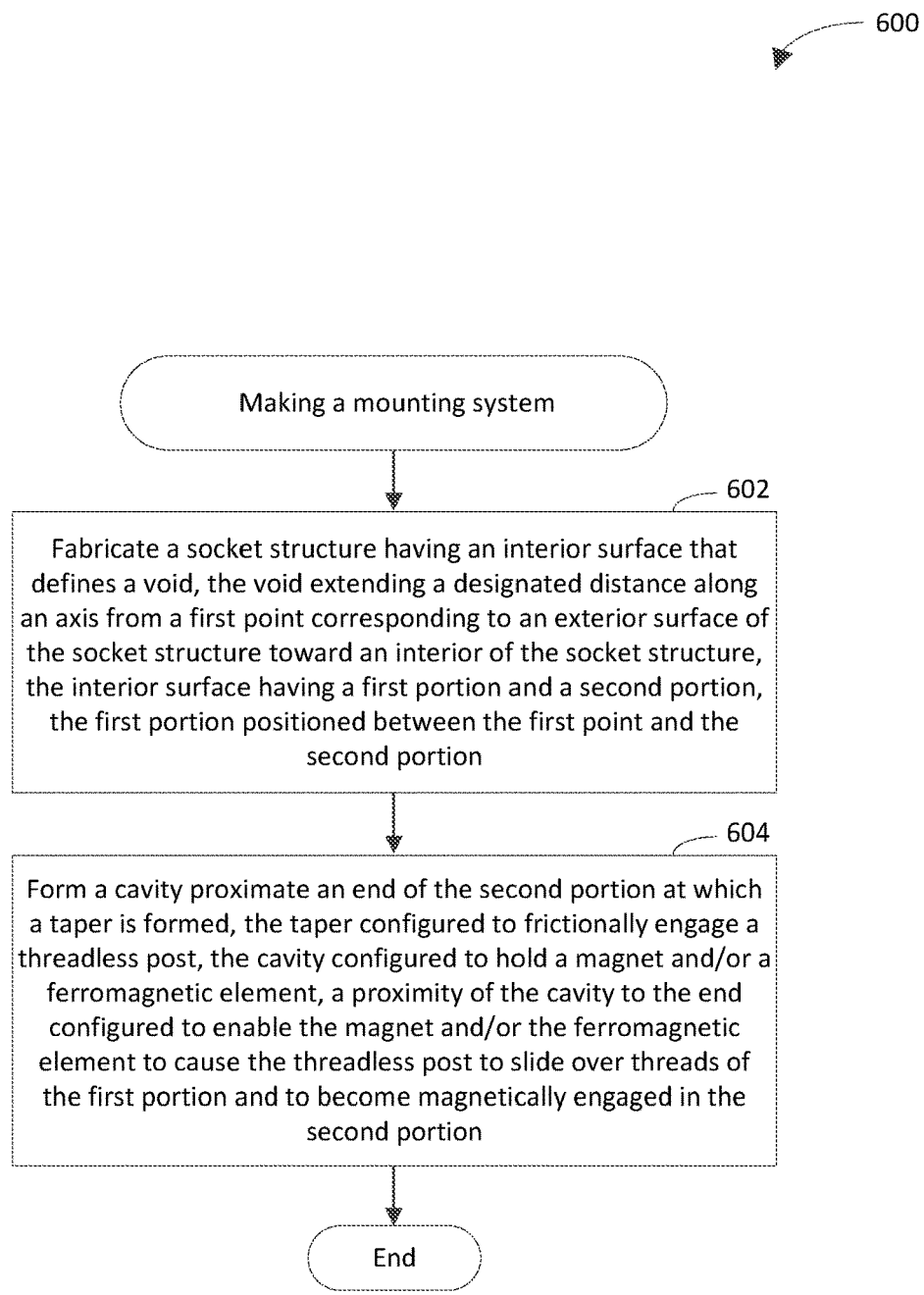
FIG. 6 depicts a flowchart of an example method for making a mounting system in accordance with an embodiment.
Figure 7:
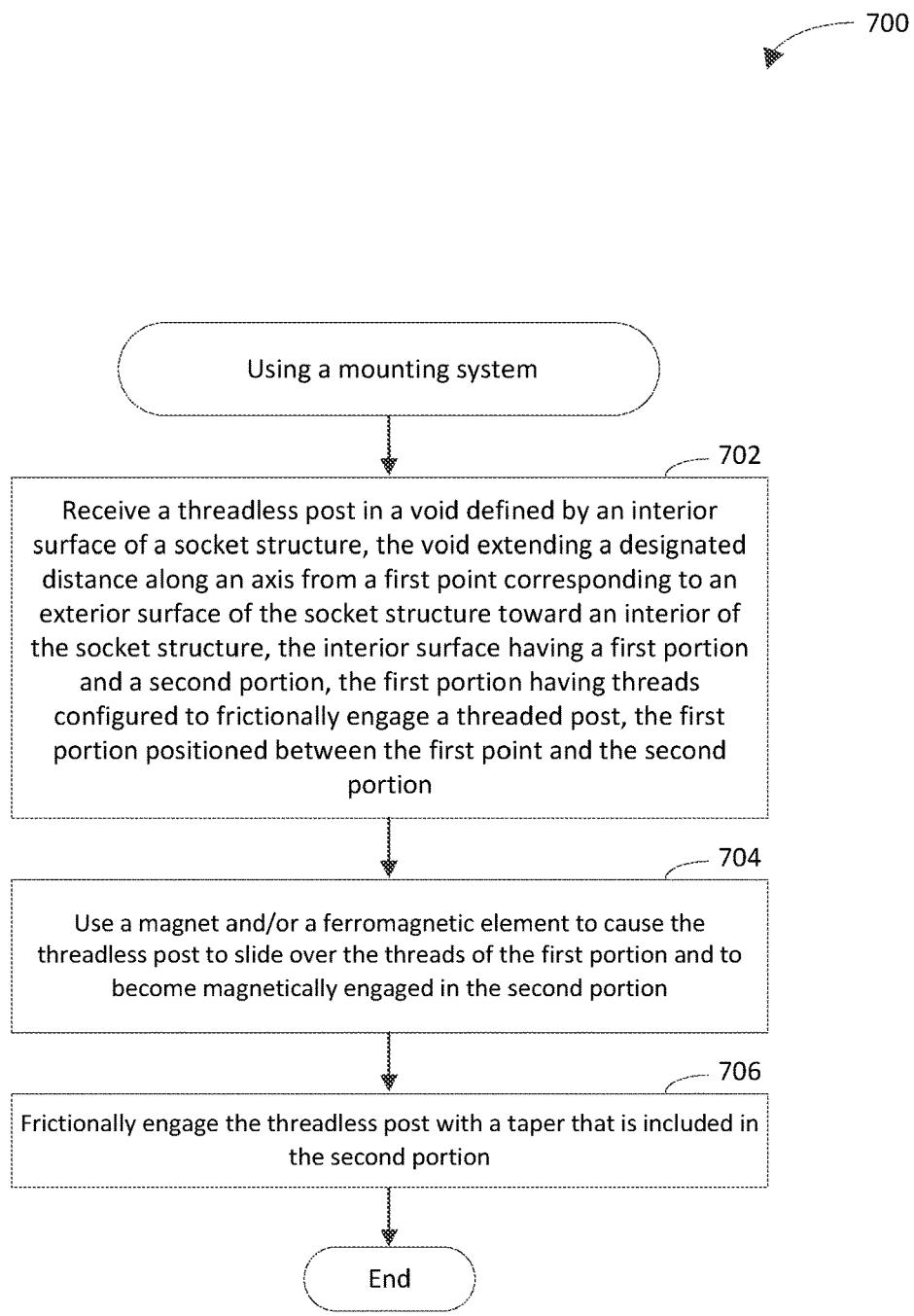
FIG. 7 depicts a flowchart of an example method for using a mounting system in accordance with an embodiment.

FIG. 6 depicts a flowchart 600 of an example method for making a mounting system (e.g., mounting system 102, 200, 300, or 500) in accordance with an embodiment. FIG. 7 depicts a flowchart 700 of an example method for using a mounting system in accordance with an embodiment. Flowcharts 600 and 700 are described with reference to the mounting system 200 shown in FIG. 2 for non-limiting, illustrative purposes. It will be recognized that the methods are applicable to any suitable mounting system.

As shown in FIG. 6, the method of flowchart 600 begins at step 602. In step 602, a socket structure having an interior surface that defines a void is fabricated. The void extends a designated distance along an axis from a first point corresponding to an exterior surface of the socket structure toward an interior of the socket structure. The interior surface has a first portion and a second portion. The first portion is positioned between the first point and the second portion.

In an example implementation of step 602, a socket structure 206 having an interior surface 230 that defines a void 220 is fabricated. The void 220 extends a designated distance, d, along an axis 210 from a first point 212 corresponding to an exterior surface 232 of the socket structure 206 toward an interior of the socket structure 206. The interior surface 230 has a first portion 216 and a second portion 218. The first portion 216 is positioned between the first point 212 and the second portion 218.

At step 604, a cavity is formed proximate an end of the second portion at which a taper is formed. The taper is configured to frictionally engage a threadless post. The cavity is configured to hold a magnet and/or a ferromagnetic element. A proximity of the cavity to the end is configured to enable the magnet and/or the ferromagnetic element to cause the threadless post to slide over threads of the first portion and to become magnetically engaged in the second portion.

In an example implementation of step 604, a cavity is formed proximate an end of the second portion 218 at which a taper is formed. The taper is configured to frictionally engage a threadless post. The cavity is configured to hold a magnet 208 and/or a ferromagnetic element. A proximity of the cavity to the end is configured to enable the magnet 208 and/or the ferromagnetic element to cause the threadless post to slide over threads of the first portion 216 and to become magnetically engaged in the second portion 218.

In an example embodiment, fabricating the socket structure at step 602 includes drilling a hole in the socket structure to define the void. In another example embodiment, fabricating the socket structure at step 602 includes forming the taper such that an angle between the axis and a surface of the taper is approximately three degrees. In yet another example embodiment, forming the cavity at step 604 includes drilling a hole in the socket structure to form the cavity. In still another example embodiment, the method of flowchart 600 further includes removing at least a designated proportion (e.g., 1/3, 2/3, 9/10, or 19/20) of a depth of the threads to facilitate the threadless post sliding across the threads of the first portion. The depth is substantially perpendicular to the axis. In accordance with this embodiment, the method of flowchart 600 may further include post-machining the threads of the first portion to ensure that the major diameter of the threads matches (e.g., is the same as)

a reference diameter. In yet another example embodiment, the method of flowchart 600 further includes placing a magnet and/or ferromagnetic element in the cavity. In accordance with this embodiment, the method of flowchart 600 may further include tuning the magnet to cause a pattern of a magnetic field that is generated by the magnet to match (e.g., be the same as) a reference pattern. For instance, the magnet may be tuned to cause the magnetic field to have a designated width perpendicular to the axis and/or a designated length along the axis.

As shown in FIG. 7, the method of flowchart 700 begins at step 702. In step 702, a threadless post is received in a void defined by an interior surface of a socket structure. The void extends a designated distance along an axis from a first point corresponding to an exterior surface of the socket structure toward an interior of the socket structure. The interior surface has a first portion and a second portion. The first portion has threads configured to frictionally engage a threaded post. The first portion is positioned between the first point and the second portion.

In an example implementation of step 702, a threadless post is received in a void 220 defined by an interior surface 230 of a socket structure 206. The void 220 extends a designated distance, d, along an axis 210 from a first point 212 corresponding to an exterior surface 232 of the socket structure 206 toward an interior of the socket structure 206. The interior surface 230 has a first portion 216 and a second portion 218. The first portion 216 has threads configured to frictionally engage a threaded post. The first portion 216 is positioned between the first point 212 and the second portion 218.

At step 704, a magnet and/or a ferromagnetic element is used to cause the threadless post to slide over the threads of the first portion and to become magnetically engaged in the second portion. In an example implementation of step 704, a magnet 208 and/or a ferromagnetic element is used to cause the threadless post to slide over the threads of the first portion 216 and to become magnetically engaged in the second portion 218.

At step 706, the threadless post is frictionally engaged with a taper that is included in the second portion. In an example implementation, the threadless post is frictionally engaged with a taper that is included in the second portion 218.

Figure 8:
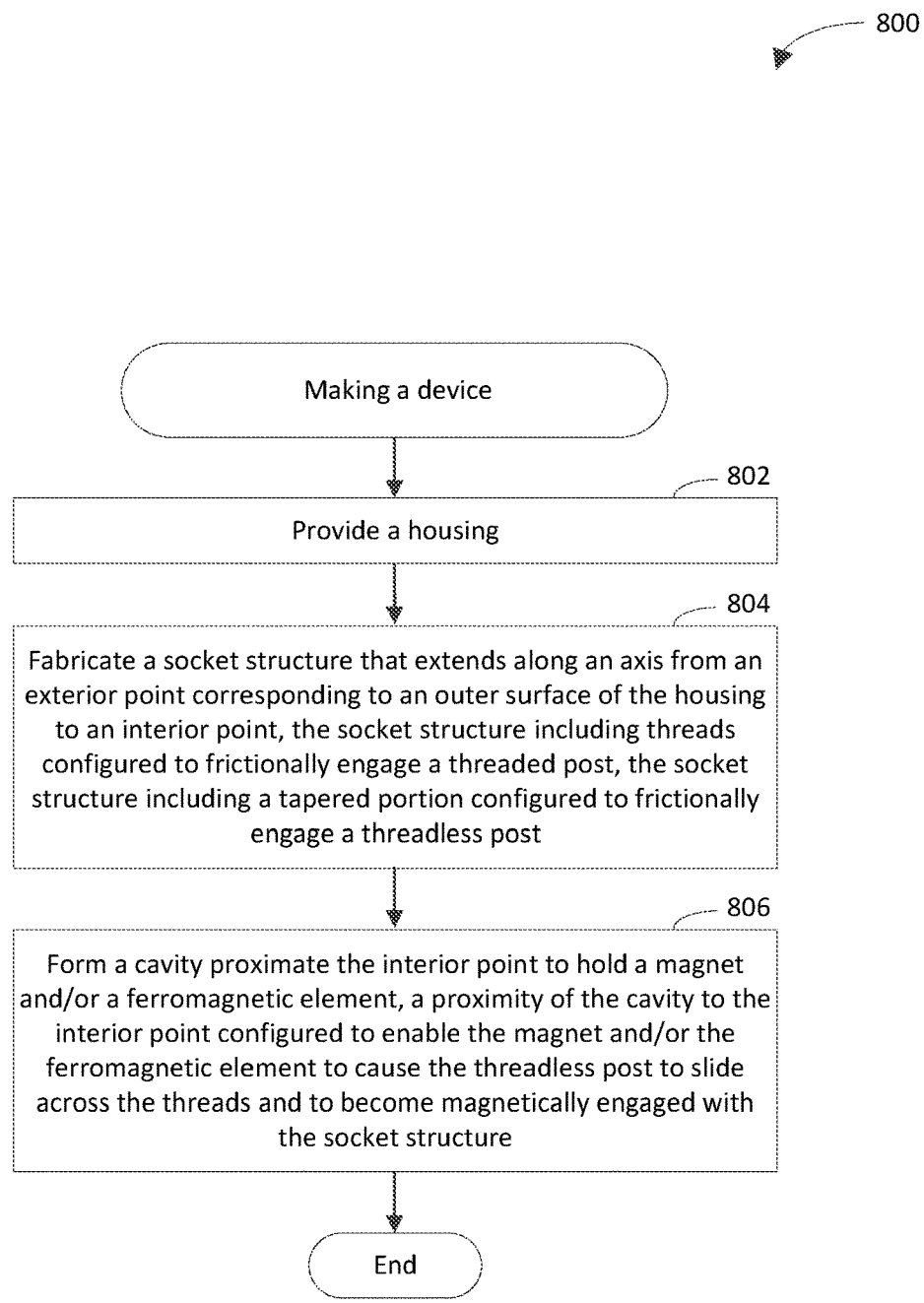
FIG. 8 depicts a flowchart of an example method for making a device that includes a mounting system in accordance with an embodiment.
Figure 9:
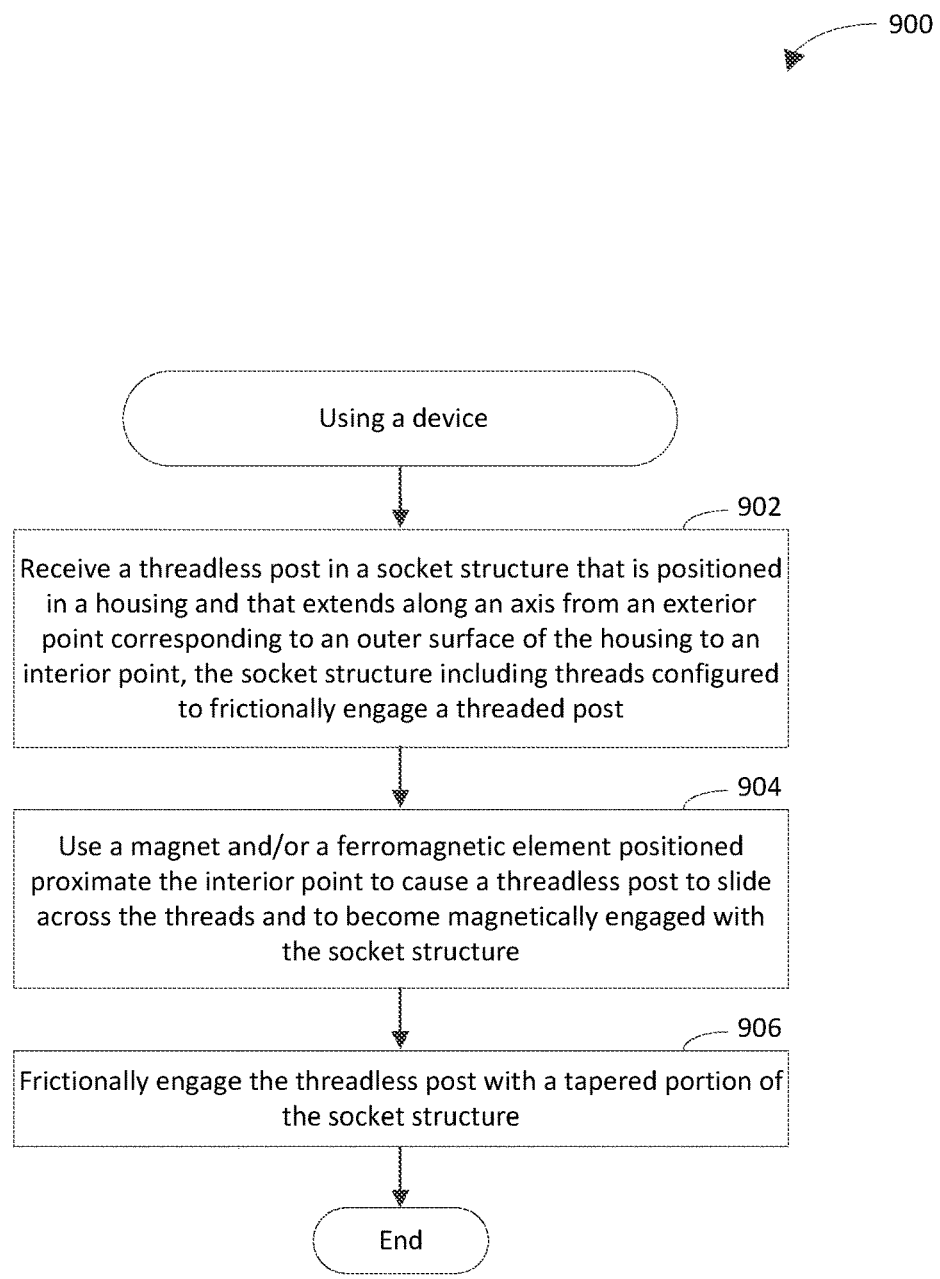
FIG. 9 depicts a flowchart of an example method for using a device that includes a mounting system in accordance with an embodiment.

FIG. 8 depicts a flowchart 800 of an example method for making a device (e.g., device 100) that includes a mounting system (e.g., mounting system 102, 200, 300, or 500) in accordance with an embodiment. FIG. 9 depicts a flowchart of an example method for using a device that includes a mounting system in accordance with an embodiment. Flowcharts 800 and 900 are described with reference to the device 100 shown in FIG. 1 for non-limiting, illustrative purposes. It will be recognized that the methods are applicable to any suitable device including any suitable mounting system.

As shown in FIG. 8, the method of flowchart 800 begins at step 802. In step 802, a housing is provided. In an example implementation of step 802, a housing 104 is provided.

At step 804, a socket structure is fabricated that extends along an axis from an exterior point corresponding to an outer surface of the housing to an interior point. The socket structure includes threads configured to frictionally engage a threaded post. The socket structure includes a tapered portion configured to frictionally engage a threadless post.

In an example implementation of step 804, a socket structure 106 is fabricated that extends along an axis 110 from an exterior point 112 corresponding to an outer surface 124 of the housing 104 to an interior point 114. The socket structure 106 includes threads configured to frictionally engage a threaded post. The socket structure 106 includes a tapered portion configured to frictionally engage a threadless post 126.

At step 806, a cavity is formed proximate the interior point to hold a magnet and/or a ferromagnetic element. A proximity of the cavity to the interior point is configured to enable the magnet and/or the ferromagnetic element to cause the threadless post to slide across the threads and to become magnetically engaged with the socket structure.

In an example implementation of step 806, a cavity 120 is formed proximate the interior point 114 to hold a magnet 108 and/or a ferromagnetic element. A proximity of the cavity 120 to the interior point 114 is configured to enable the magnet 108 and/or the ferromagnetic element to cause the threadless post 126 to slide across the threads and to become magnetically engaged with the socket structure 106.

As shown in FIG. 9, the method of flowchart 900 begins at step 902. In step 902, a threadless post is received in a socket structure that is positioned in a housing and that extends along an axis from an exterior point corresponding to an outer surface of the housing to an interior point. The socket structure includes threads configured to frictionally engage a threaded post.

In an example implementation of step 902, a threadless post 126 is received in a socket structure 106 that is positioned in a housing 104 and that extends along an axis 110 from an exterior point 112 corresponding to an outer surface 124 of the housing 104 to an interior point 114. The socket structure 106 includes threads configured to frictionally engage a threaded post.

At step 904, a magnet and/or a ferromagnetic element positioned proximate the interior point is used to cause a threadless post to slide across the threads and to become magnetically engaged with the socket structure. In an example implementation of step 904, a magnet 108 and/or a ferromagnetic element positioned proximate the interior point 114 is used to cause a threadless post 126 to slide across the threads and to become magnetically engaged with the socket structure 106.

At step 906, the threadless post is frictionally engaged with a tapered portion of the socket structure. In an example implementation of step 906, the threadless post 126 is frictionally engaged with a tapered portion of the socket structure 106.

In some example embodiments, one or more the steps shown in flowcharts 600, 700, 800, and 900 may not be performed. Moreover, one or more steps in addition to or in lieu of any one or more of the steps shown in flowcharts 600, 700, 800, and 900 may be performed.

III. Further Discussion of Some Example Embodiments

An example mounting system comprises a socket structure having an interior surface that defines a void. The void extends a designated distance along an axis from a first point corresponding to an exterior surface of the socket structure toward an interior of the socket structure. The interior surface has a first portion and a second portion. The first portion has threads configured to frictionally engage a threaded post. The first portion is positioned between the first point and the second portion. The second portion includes a taper that is configured to frictionally engage a threadless post. The example mounting system further comprises at least one of a magnet or a ferromagnetic element configured to cause the threadless post to slide over the threads of the first portion and to become magnetically engaged with the second portion.

In a first aspect of the example mounting system, the threads have a major diameter of one-quarter of an inch and a thread density of twenty threads per inch.

In a second aspect of the example mounting system, an angle between the axis and a surface of the taper is approximately three degrees. The second aspect of the example mounting system may be implemented in combination with the first aspect of the example mounting system, though the example embodiments are not limited in this respect.

In a third aspect of the example mounting system, a projection of the taper on the axis has a length of at least three millimeters. The third aspect of the example mounting system may be implemented in combination with the first and/or second aspect of the example mounting system, though the example embodiments are not limited in this respect.

In a fourth aspect of the example mounting system, the at least one of the magnet or the ferromagnetic element comprises a flux fountain configured to generate a magnetic field and to direct the magnetic field along the axis toward the first point. The fourth aspect of the example mounting system may be implemented in combination with the first, second, and/or third aspect of the example mounting system, though the example embodiments are not limited in this respect.

In a fifth aspect of the example mounting system, the at least one of the magnet or the ferromagnetic element comprises a Halbach array of magnets configured to generate a magnetic field and to direct the magnetic field along the axis toward the first point. The fifth aspect of the example mounting system may be implemented in combination with the first, second, third, and/or fourth aspect of the example mounting system, though the example embodiments are not limited in this respect.

In a sixth aspect of the example mounting system, the at least one of the magnet or the ferromagnetic element comprises the magnet configured to generate a magnetic field having a strength that is capable of causing the threadless post to become frictionally re-engaged with the taper in response to the threadless post becoming frictionally disengaged from the taper. The sixth aspect of the example mounting system may be implemented in combination with the first, second, third, fourth, and/or fifth aspect of the example mounting system, though the example embodiments are not limited in this respect.

In a seventh aspect of the example mounting system, the socket structure comprises a moldable polymer material having a surface that defines the taper, the moldable polymer material configured to conform to a tapered end of the threadless post. The seventh aspect of the example mounting system may be implemented in combination with the first, second, third, fourth, fifth, and/or sixth aspect of the example mounting system, though the example embodiments are not limited in this respect.

In an eighth aspect of the example mounting system, at least twenty-five percent of a depth of the threads is removed to facilitate the threadless post sliding over the threads, the depth being substantially perpendicular to the axis. The eighth aspect of the example mounting system may be implemented in combination with the first, second, third, fourth, fifth, sixth, and/or seventh aspect of the example mounting system, though the example embodiments are not limited in this respect.

In a ninth aspect of the example mounting system, the example mounting system further comprises the threadless post at least partially coated with a moldable polymer material. The ninth aspect of the example mounting system may be implemented in combination with the first, second, third, fourth, fifth, sixth, seventh, and/or eighth aspect of the example mounting system, though the example embodiments are not limited in this respect.

In a tenth aspect of the example mounting system, the example mounting system further comprises the threadless post. In accordance with the tenth aspect, the threadless post comprises a magnet configured to facilitate magnetic engagement with the second portion. The tenth aspect of the example mounting system may be implemented in combination with the first, second, third, fourth, fifth, sixth, seventh, eighth, and/or ninth aspect of the example mounting system, though the example embodiments are not limited in this respect.

In an eleventh aspect of the example mounting system, the example mounting system further comprises the threadless post. In accordance with the eleventh aspect, the threadless post comprises a flux fountain configured to facilitate magnetic engagement with the second portion. The eleventh aspect of the example mounting system may be implemented in combination with the first, second, third, fourth, fifth, sixth, seventh, eighth, ninth, and/or tenth aspect of the example mounting system, though the example embodiments are not limited in this respect.

A first example device comprises a housing, a socket structure, and at least one of a magnet or a ferromagnetic element. The socket structure extends along an axis from an exterior point corresponding to an outer surface of the housing to an interior point. The socket structure includes a threaded portion and an unthreaded portion. The threaded portion includes threads configured to frictionally engage a threaded post. The threaded portion is positioned between the exterior point and the unthreaded portion. The unthreaded portion includes a tapered portion. The at least one of the magnet or the ferromagnetic element is positioned proximate the interior point to cause a threadless post to slide across the threads of the threaded portion and to become magnetically engaged with the socket structure, the tapered portion of the unthreaded portion configured to frictionally engage the threadless post.

In a first aspect of the first example device, the threads of the threaded portion have a major diameter of one-quarter of an inch and a thread density of twenty threads per inch.

In a second aspect of the first example device, an angle between the axis and a surface of the tapered portion that is configured to frictionally engage the threadless post is approximately three degrees. The second aspect of the first example device may be implemented in combination with the first aspect of the first example device, though the example embodiments are not limited in this respect.

In a third aspect of the first example device, the unthreaded portion of the socket structure has a length of at least three millimeters along the axis. The third aspect of the first example device may be implemented in combination with the first and/or second aspect of the first example device, though the example embodiments are not limited in this respect.

In a fourth aspect of the first example device, the at least one of the magnet or the ferromagnetic element comprises a flux fountain configured to generate a magnetic field and to direct the magnetic field along the axis toward the exterior point. The fourth aspect of the first example device may be implemented in combination with the first, second, and/or third aspect of the first example device, though the example embodiments are not limited in this respect.

In a fifth aspect of the first example device, the at least one of the magnet or the ferromagnetic element comprises a Halbach array of magnets configured to generate a magnetic field and to direct the magnetic field along the axis toward the exterior point. The fifth aspect of the first example device may be implemented in combination with the first, second, third, and/or fourth aspect of the first example device, though the example embodiments are not limited in this respect.

In a sixth aspect of the first example device, the at least one of the magnet or the ferromagnetic element comprises the magnet configured to generate a magnetic field having a strength that is capable of causing the threadless post to become frictionally re-engaged with the tapered portion of the unthreaded portion in response to the threadless post becoming frictionally disengaged from the tapered portion. The sixth aspect of the first example device may be implemented in combination with the first, second, third, fourth, and/or fifth aspect of the first example device, though the example embodiments are not limited in this respect.

In a seventh aspect of the first example device, the tapered portion comprises a moldable polymer material configured to conform to a tapered end of the threadless post. The seventh aspect of the first example device may be implemented in combination with the first, second, third, fourth, fifth, and/or sixth aspect of the first example device, though the example embodiments are not limited in this respect.

In an eighth aspect of the first example device, at least fifty percent of a depth of the threads is removed to facilitate the threadless post sliding across the threads, the depth being substantially perpendicular to the axis. The eighth aspect of the first example device may be implemented in combination with the first, second, third, fourth, fifth, sixth, and/or seventh aspect of the first example device, though the example embodiments are not limited in this respect.

In a ninth aspect of the first example device, the first example device further comprises optical equipment configured to capture images of an environment of the device. In accordance with the ninth aspect, the first example device further comprises one or more processors configured to process the images. The ninth aspect of the first example device may be implemented in combination with the first, second, third, fourth, fifth, sixth, seventh, and/or eighth aspect of the first example device, though the example embodiments are not limited in this respect.

A second example device comprises a housing, a socket structure, and at least one of a magnet or a ferromagnetic element. The socket structure including threads configured to frictionally engage a threaded post. The socket structure including a tapered portion configured to frictionally engage a threadless post. The socket structure configured to expose the threadless post to physical contact with the threads and to enable the threadless post to slide across the threads. The at least one of the magnet or the ferromagnetic element is positioned proximate the interior point. The at least one of the magnet or the ferromagnetic element is configured to cause the threadless post to be magnetically engaged with the socket structure.

In a first aspect of the second example device, the threads of the socket structure have a major diameter of one-quarter of an inch and a thread density of twenty threads per inch.

In a second aspect of the second example device, an angle between the axis and a surface of the tapered portion that is configured to frictionally engage the threadless post is approximately three degrees. The second aspect of the second example device may be implemented in combination with the first aspect of the second example device, though the example embodiments are not limited in this respect.

In a third aspect of the second example device, the at least one of the magnet or the ferromagnetic element comprises a flux fountain configured to generate a magnetic field and to direct the magnetic field along the axis toward the exterior point. The third aspect of the second example device may be implemented in combination with the first and/or second aspect of the second example device, though the example embodiments are not limited in this respect.

In a fourth aspect of the second example device, the at least one of the magnet or the ferromagnetic element comprises a Halbach array of magnets configured to generate a magnetic field and to direct the magnetic field along the axis toward the exterior point. The fourth aspect of the second example device may be implemented in combination with the first, second, and/or third aspect of the second example device, though the example embodiments are not limited in this respect.

In a fifth aspect of the second example device, the at least one of the magnet or the ferromagnetic element comprises the magnet configured to generate a magnetic force along the axis that is greater than a force of gravity. The fifth aspect of the second example device may be implemented in combination with the first, second, third, and/or fourth aspect of the second example device, though the example embodiments are not limited in this respect.

In a sixth aspect of the second example device, the tapered portion comprises a moldable polymer material configured to conform to a tapered end of the threadless post. The sixth aspect of the second example device may be implemented in combination with the first, second, third, fourth, and/or fifth aspect of the second example device, though the example embodiments are not limited in this respect.

In a seventh aspect of the second example device, at least eighty-five percent of a depth of the threads is removed to facilitate the threadless post sliding across the threads, the depth being substantially perpendicular to the axis. The seventh aspect of the second example device may be implemented in combination with the first, second, third, fourth, fifth, and/or sixth aspect of the second example device, though the example embodiments are not limited in this respect.

In an eighth aspect of the second example device, the second example device further comprises optical equipment configured to capture images of an environment of the device. In accordance with the eighth aspect, the second example device further comprises one or more processors configured to process the images. The eighth aspect of the second example device may be implemented in combination with the first, second, third, fourth, fifth, sixth, and/or seventh aspect of the second example device, though the example embodiments are not limited in this respect.

In an example method of making a mounting system, a socket structure having an interior surface that defines a void is fabricated. The void extends a designated distance along an axis from a first point corresponding to an exterior surface of the socket structure toward an interior of the socket structure. The interior surface has a first portion and a second portion. The first portion is positioned between the first point and the second portion. The fabricating comprises forming threads on the first portion. The threads are configured to frictionally engage a threaded post. The fabricating further comprises forming a taper at an end of the second portion. The taper is configured to frictionally engage a threadless post. A cavity is formed proximate the end of the second portion to hold at least one of a magnet or a ferromagnetic element. A proximity of the cavity to the end is configured to enable the at least one of the magnet or the ferromagnetic element to cause the threadless post to slide over the threads of the first portion and to become magnetically engaged in the second portion.

In an example method of using a mounting system, a threadless post is received in a void defined by an interior surface of a socket structure. The void extends a designated distance along an axis from a first point corresponding to an exterior surface of the socket structure toward an interior of the socket structure. The interior surface has a first portion and a second portion. The first portion has threads configured to frictionally engage a threaded post. The first portion is positioned between the first point and the second portion. The second portion includes a taper. At least one of a magnet or a ferromagnetic element is used to cause the threadless post to slide over the threads of the first portion and to become magnetically engaged in the second portion. The threadless post is frictionally engaged with the taper of the second portion.

In a first example method of making a device, a housing is provided. A socket structure that extends along an axis from an exterior point corresponding to an outer surface of the housing to an interior point is fabricated. The socket structure includes a threaded portion and an unthreaded portion. The threaded portion includes threads configured to frictionally engage a threaded post. The threaded portion is positioned between the exterior point and the unthreaded portion. The unthreaded portion includes a tapered portion. A cavity is formed proximate the interior point to hold at least one of a magnet or a ferromagnetic element. A proximity of the cavity to the interior point is configured to enable the at least one of the magnet or the ferromagnetic element to cause a threadless post to slide across the threads of the threaded portion and to become magnetically engaged with the socket structure. The tapered portion of the unthreaded portion is configured to frictionally engage the threadless post.

In a second example method of making a device, a housing is provided. A socket structure that extends along an axis from an exterior point corresponding to an outer surface of the housing to an interior point is fabricated. The socket structure includes threads configured to frictionally engage a threaded post. The socket structure includes a tapered portion configured to frictionally engage a threadless post. The socket structure is configured to expose the threadless post to physical contact with the threads in the socket structure. A cavity is formed proximate the interior point to hold at least one of a magnet or a ferromagnetic element. A proximity of the cavity to the interior point is configured to enable the at least one of the magnet or the ferromagnetic element to cause the threadless post to slide across the threads and to be magnetically held in the socket structure.

In a first example method of using a device, a threadless post is received in a socket structure that is positioned in a housing and that extends along an axis from an exterior point corresponding to an outer surface of the housing to an interior point. The socket structure includes a threaded portion and an unthreaded portion. The threaded portion includes threads configured to frictionally engage a threaded post. The threaded portion is positioned between the exterior point and the unthreaded portion. The unthreaded portion includes a tapered portion. At least one of a magnet or a ferromagnetic element positioned proximate the interior point is used to cause the threadless post to slide across the threads of the threaded portion and to become magnetically engaged with the socket structure. The threadless post is frictionally engaged with the tapered portion of the unthreaded portion.

In a second example method of using a device, a threadless post is received in a socket structure that is positioned in a housing and that extends along an axis from an exterior point corresponding to an outer surface of the housing to an interior point. The socket structure includes threads configured to frictionally engage a threaded post. The threadless post is exposed to physical contact with the threads in the socket structure. At least one of a magnet or a ferromagnetic element positioned proximate the interior point is used to cause the threadless post to slide across the threads and to be magnetically held in the socket structure. The threadless post is frictionally engaged in a tapered portion of the socket structure.

IV. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A mounting system, comprising:
    a socket structure having an interior surface that defines a void, the void extending a designated distance along an axis from a first point corresponding to an exterior surface of the socket structure toward an interior of the socket structure,
    the interior surface having a first portion and a second portion,
    the first portion having threads configured to frictionally engage a threaded post,
    the first portion positioned between the first point and the second portion,
    the second portion including a taper that is configured to frictionally engage a threadless post; and
    at least one of a magnet or a ferromagnetic element configured to cause the threadless post to slide over the threads of the first portion and to become magnetically engaged with the second portion.

2. The mounting system of claim 1, wherein the threads have a major diameter of one-quarter of an inch and a thread density of twenty threads per inch.

3. The mounting system of claim 1, wherein an angle between the axis and a surface of the taper is approximately three degrees.

4. The mounting system of claim 1, wherein a projection of the taper on the axis has a length of at least three millimeters.

5. The mounting system of claim 1, wherein the at least one of the magnet or the ferromagnetic element comprises:
    a flux fountain configured to generate a magnetic field and to direct the magnetic field along the axis toward the first point.

6. The mounting system of claim 1, wherein the at least one of the magnet or the ferromagnetic element comprises:
    a Halbach array of magnets configured to generate a magnetic field and to direct the magnetic field along the axis toward the first point.

7. The mounting system of claim 1, wherein the at least one of the magnet or the ferromagnetic element comprises:

the magnet configured to generate a magnetic field having a strength that is capable of causing the threadless post to become frictionally re-engaged with the taper in response to the threadless post becoming frictionally disengaged from the taper.

8. The mounting system of claim 1, wherein the socket structure comprises:
a moldable polymer material having a surface that defines the taper, the moldable polymer material configured to conform to a tapered end of the threadless post.

9. The mounting system of claim 1, wherein at least twenty-five percent of a depth of the threads is removed to facilitate the threadless post sliding over the threads, the depth being substantially perpendicular to the axis.

10. The mounting system of claim 1, further comprising:
the threadless post at least partially coated with a moldable polymer material.

11. The mounting system of claim 1, further comprising:
the threadless post;
wherein the threadless post comprises a magnet configured to facilitate magnetic engagement with the second portion.

12. The mounting system of claim 1, further comprising:
the threadless post;
wherein the threadless post comprises a flux fountain configured to facilitate magnetic engagement with the second portion.

13. A device, comprising:
a housing;
a socket structure that extends along an axis from an exterior point corresponding to an outer surface of the housing to an interior point,
the socket structure having an interior surface that defines a void extending along the axis, the interior surface including a threaded portion and an unthreaded portion,
the threaded portion including threads configured to frictionally engage a threaded post,
the threaded portion positioned between the exterior point and the unthreaded portion in a direction along the axis,
the unthreaded portion including a tapered portion; and
at least one of a magnet or a ferromagnetic element positioned proximate the interior point to cause a threadless post to slide across and to be exposed to the threads of the threaded portion and to become magnetically engaged with the socket structure, the tapered portion of the unthreaded portion configured to frictionally engage the threadless post.

14. The device of claim 13, wherein the at least one of the magnet or the ferromagnetic element comprises:
the magnet configured to generate a magnetic field having a strength that is capable of causing the threadless post to become frictionally re-engaged with the tapered portion of the unthreaded portion in response to the threadless post becoming frictionally disengaged from the tapered portion.

15. The device of claim 13, wherein the tapered portion comprises:
a moldable polymer material configured to conform to a tapered end of the threadless post.

16. The device of claim 13, further comprising:
optical equipment configured to capture images of an environment of the device; and
one or more processors configured to process the images.

17. A device, comprising:
a housing;
a socket structure that extends along an axis from an exterior point corresponding to an outer surface of the housing to an interior point,
the socket structure including threads configured to frictionally engage a threaded post,
the socket structure including a tapered portion configured to frictionally engage a threadless post,
the socket structure configured to expose the threadless post to physical contact with the threads and to enable the threadless post to slide across the threads; and
at least one of a magnet or a ferromagnetic element positioned proximate the interior point, the at least one of the magnet or the ferromagnetic element configured to cause the threadless post to be magnetically engaged with the socket structure.

18. The device of claim 17, wherein an angle between the axis and a surface of the tapered portion that is configured to frictionally engage the threadless post is approximately three degrees.

19. The device of claim 17, wherein the at least one of the magnet or the ferromagnetic element comprises:
the magnet configured to generate a magnetic force along the axis that is greater than a force of gravity.

20. The device of claim 17, wherein at least eighty-five percent of a depth of the threads is removed to facilitate the threadless post sliding across the threads, the depth being substantially perpendicular to the axis.

* * * * *